(12) United States Patent
Mihara

(10) Patent No.: US 9,267,585 B2
(45) Date of Patent: Feb. 23, 2016

(54) ACTUATOR WITH JOINTS

(75) Inventor: Masaaki Mihara, Chiba (JP)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 437 days.

(21) Appl. No.: 13/823,193

(22) PCT Filed: Jun. 2, 2011

(86) PCT No.: PCT/US2011/038834
§ 371 (c)(1),
(2), (4) Date: Mar. 14, 2013

(87) PCT Pub. No.: WO2012/166136
PCT Pub. Date: Dec. 6, 2012

(65) Prior Publication Data
US 2013/0174680 A1   Jul. 11, 2013

(51) Int. Cl.
*F16H 19/08* (2006.01)
(52) U.S. Cl.
CPC .............. *F16H 19/08* (2013.01); *Y10T 74/1888* (2015.01)
(58) Field of Classification Search
CPC ....... F16H 19/08; B25J 9/042; Y10T 74/1888
See application file for complete search history.

(56) References Cited

U.S. PATENT DOCUMENTS

| 4,606,695 A | 8/1986 | Lenz |
| 4,662,814 A | 5/1987 | Suzuki et al. |
| 8,376,685 B2 * | 2/2013 | Pietrantonio ............ B25J 9/042 414/744.5 |
| 2009/0233519 A1 | 9/2009 | Ejima |
| 2010/0005918 A1 | 1/2010 | Mizuno et al. |
| 2010/0095800 A1 * | 4/2010 | Palau ........................ B25J 9/042 74/490.03 |
| 2011/0252921 A1 * | 10/2011 | Nakagiri .................. B25J 9/104 74/665 R |
| 2011/0262257 A1 * | 10/2011 | Hino ........................ B25J 9/042 414/744.5 |

OTHER PUBLICATIONS

International Search Report dated Dec. 2, 2011 in Application No. PCT/US2011/038834.
Written Opinion of the International Searching Authority dated Dec. 2, 2011 in Application No. PCT/US2011/038834.
Granosik et al., "Integrated Joint Actuator for Serpentine Robots", IEEE/ASME Transactions on Mechatronics, vol. 10, No. 5, Oct. 2005, pp. 473-481.
Shiqi Li, Yang Liu, Ming Xie, (2010) "Implementation of a single motor driven manipulator with multiple joints", Industrial Robot: An International Journal, vol. 38 Iss: 1, Abstract Only.

* cited by examiner

*Primary Examiner* — David M Fenstermacher
(74) *Attorney, Agent, or Firm* — Maschoff Brennan

(57) ABSTRACT

Implementations and techniques are generally disclosed for an actuator comprising: a first element, a second element, a third element, a first joint provided between the first element and the second element, a second joint provided between the second element and the third element, and a motor operably coupled to the first joint and configured such that the second element rotates with respect to the first element about a first rotational axis when the motor rotates, wherein the first joint is operably coupled to the second joint and configured such that the third element can rotate with respect to the second element about a second rotational axis when the motor rotates.

14 Claims, 6 Drawing Sheets

ACTUATOR WITH JOINTS

CROSS-REFERENCE TO RELATED APPLICATIONS

This patent application is the U.S. national stage filing under 35 U.S.C. § 371 of International Application No. PCT/US2011/038834 filed on Jun. 2, 2011, which is incorporated herein by reference.

BACKGROUND

Unless otherwise indicated herein, the approaches described in this section are not prior art to the claims in this application and are not admitted to be prior art by inclusion in this section.

An actuator can be widely used in various applications. The present disclosure contemplates an actuator with reduced weight.

SUMMARY

According to various embodiments, an actuator is described which has reduced weight.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Figure 1:
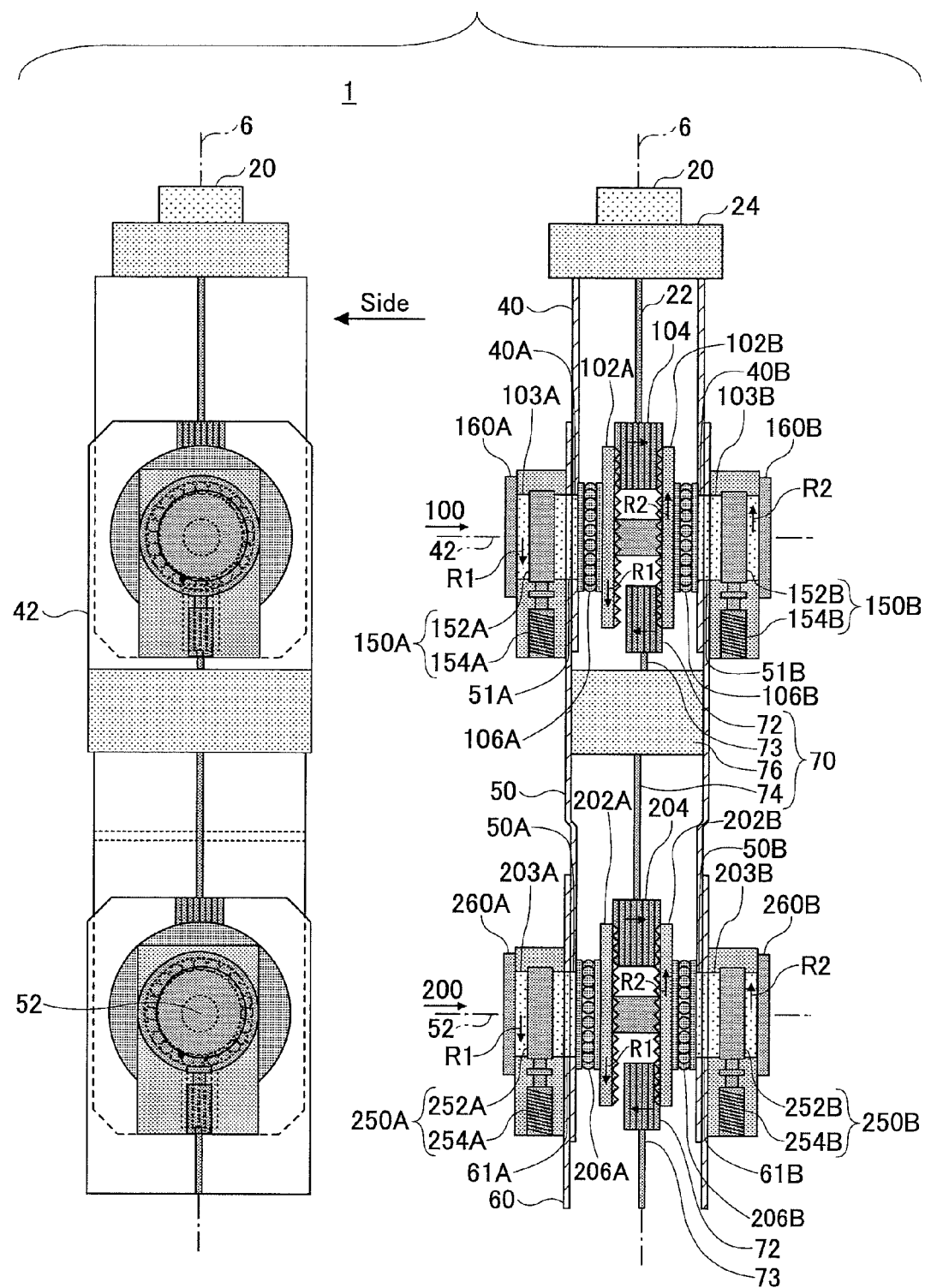
FIG. 1 is a diagram illustrating an example actuator 1.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

FIG. 1 is a two-view drawing for showing an example actuator 1 that is arranged in accordance with at least some embodiments of the present disclosure. The actuator 1 may be implemented as any type of a robot or machine or may be used in any type of a robot or machine.

In FIG. 1, a part (i.e., one end portion) of the actuator 1 is shown. Hereafter, a configuration of the illustrated part of the actuator 1 is mainly described.

The actuator 1 may include a motor 20. The motor 20 may be any type of a motor. For example, the motor 20 may be an electric motor or any type of a hydraulic motor. The motor 20 may have a rotational axis which may be coaxial with a center axis 6.

The motor 20 may be coupled to a first drive shaft 22. The first drive shaft 22 may be may be coaxial with the center axis 6. The motor 20 may be directly coupled to the first drive shaft 22. In other words, the first drive shaft 22 may be an output shaft of the motor 20. Alternatively, the motor 20 may be coupled to the first drive shaft 22 via a reduction gear 24, for example.

The actuator 1 may include more than three arms. In FIG. 1, a first arm 40, a second arm 50 and a third arm 60 are shown.

The first arm 40, the second arm 50 and the third arm 60 may have many forms or configurations. For example, the first arm 40, the second arm 50 and the third arm 60 may be implemented by portions of a body of a robot to which the actuator 1 is installed.

The first arm 40 and the second arm 50 may be configured to have overlapped portions in which holes 40A, 51A, 40B, 51B (described hereafter) are formed. In various illustrated embodiments, the first arm 40 is overlapped with the second arm 50 such that the first arm 40 is located inwardly. However, the first arm 40 may be located outwardly with respect to the second arm 50. Alternatively, the first arm 40 may be overlapped with the second arm 50 such that one side of the first arm 40 is located inwardly and other side of the first arm 40 is located outwardly, and vice versa.

Similarly, the second arm 50 and the third arm 60 may have overlapped portions in which holes 50A, 61A, 50B, 61B (described hereafter) can be formed. In various illustrated embodiments, the second arm 50 is overlapped with the third arm 60 such that the second arm 50 is located inwardly; however, the second arm 50 may be located outwardly with respect to the third arm 60. Alternatively, the second arm 50 may be overlapped with the third arm 60 such that one side of the second arm 50 is located inwardly and other side of the second arm 50 is located outwardly, or vice versa.

The actuator 1 may include more than two joints. In FIG. 1, a first joint 100 and a second joint 200 are shown.

The first joint 100 may be provided between the first arm 40 and the second arm 50. In other words, the first arm 40 and the second arm 50 may be coupled via the first joint 100. The first joint 100 may be adapted such that the second arm 50 is rotatable with respect to the first arm 40 about a first rotational axis 42.

The first joint 100 may include two first crown gears 102A, 102B, a first spur gear 104 and two first thrust bearings 106A, 106B.

The first crown gears 102A, 102B may be disposed such that they rotate about the first rotational axis 42. Further, the first crown gears 102A, 102B may be disposed such that they are opposed to each other with a predetermined space therebetween in a direction of the first rotational axis 42.

The first spur gear 104 may be coupled to the first drive shaft 22. In other words, the first spur gear 104 may be driven by the motor 20 via the first drive shaft 22. The first spur gear 104 may be disposed between first crown gears 102A, 102B such that it rotates about the center axis 6. Further, the first spur gear 104 may be engaged with the two first crown gears 102A, 102B such that the two first crown gears 102A, 102B rotate in opposite directions when the first spur gear 104 rotates. Thus, the first crown gears 102A, 102B may be driven by the motor 20 via the first drive shaft 22 and the first spur gear 104.

The first spur gear 104 may be supported by the first arm 40 such that its relative position with respect to the first arm 40 is approximately constant. In other words, a rotational axis of the first spur gear 104, which may correspond to the center axis 6, may not rotate about the first rotational axis 42 with respect to the first arm 40 when the second arm 50 rotates with respect to the first arm 40 about the first rotational axis 42.

The first thrust bearings 106A, 106B may be provided between the first arm 40 and the corresponding first crown gears 102A, 102B. Specifically, the first thrust bearing 106A may be configured such that it bears a thrust load transmitted from the first crown gear 102A. Similarly, the first thrust bearing 106B may be configured such that it bears a thrust load transmitted from the first crown gear 102B. The first thrust bearing 106A may be configured about a rotation shaft 103A coupled to the first thrust bearing 106A. Similarly, the first thrust bearing 106B may be configured about a rotation shaft 103B coupled to the first thrust bearing 106B. The rotation shafts 103A, 103B define the first rotational axis 42. The rotation shaft 103A may be configured to extend through holes 40A, 51A which may be formed in the first and second arms 40, 50, respectively. Similarly, the rotation shaft 103B may configured to extend through holes 40B, 51B which may be formed in the first and second arms 40, 50, respectively. Axial bearings (not shown) may be provided about holes 40A, 51A, 40B, 51B and configured such that they rotatably support the rotation shafts 103A, 103B.

The second joint 200 may be provided between the second arm 50 and the third arm 60. In other words, the second arm 50 and the third arm 60 may be coupled via the second joint 200. The second joint 200 may be adapted such that the third arm 60 is rotatable with respect to the second arm 50 about a second rotational axis 52.

The second joint 200 may include two second crown gears 202A, 202B, a second spur gear 204 and two second thrust bearings 206A, 206B.

The second crown gears 202A, 202B may be disposed such that they rotate about the second rotational axis 52. Further, the second crown gears 202A, 202B may be disposed such that they are opposed to each other with a predetermined space therebetween in a direction of the second rotational axis 52.

The second spur gear 204 may be disposed between second crown gears 202A, 202B such that the second spur gear 204 may rotate about its rotational axis. The rotational axis of the second spur gear 204 may correspond to the center axis 6. Alternatively, the rotational axis of the second spur gear 204 may be oriented parallel to and offset with respect to the center axis 6. Further, the second spur gear 204 may be configured to engage with the two second crown gears 202A, 202B such that the two second crown gears 202A, 202B may rotate in opposite directions when the second spur gear 204 rotates.

The second spur gear 204 may be supported by the second arm 50 such that its relative position with respect to the second arm 50 is approximately constant. In other words, a rotational axis of the second spur gear 204 may not rotate about the second rotational axis 52 with respect to the second arm 50 when the third arm 60 rotates with respect to the second arm 50 about the second rotational axis 52.

The second thrust bearings 206A, 206B may be provided between the second arm 50 and the corresponding second crown gears 202A, 202B. Specifically, the second thrust bearing 206A may be configured such that it bears a thrust load transmitted from the second crown gear 202A. Similarly, the second thrust bearing 206B may be provided such that it bears a thrust load transmitted from the second crown gear 202B. The second thrust bearing 206A may be provided about a rotation shaft 203A coupled to the second thrust bearing 206A. Similarly, the second thrust bearing 206B may be provided about a rotation shaft 203B coupled to the second thrust bearing 206B. The rotation shafts 203A, 203B define the second rotational axis 52. The rotation shaft 203A may extend through holes 50A, 61A which may be formed in the second and third arms 50, 60, respectively. Similarly, the rotation shaft 203B may extend through holes 50B, 61B which may be formed in the second and third arms 50, 60, respectively. Axial bearings (not shown) may be provided about holes 50A, 61A, 50B, 61B such that they rotatably support the rotation shafts 203A, 203B.

The actuator 1 may include more than one intermediate drive mechanism. The intermediate drive mechanisms may be between the respective neighboring joints. In FIG. 1, an intermediate drive mechanism 70 between the first joint 100 and the second joint 200 is shown. Another similar intermediate drive mechanism may be provided between the second joint 200 and a third joint (not shown), and so on. The number N1 of the intermediate drive mechanisms may depend on the number N2 of the joints. In some typical examples, number N1 may be determined by N2−1.

The intermediate drive mechanism 70 may be configured effective to rotate the second crown gears 202A, 202B in opposite directions using the rotational movement of any one of the first crown gears 102A, 102B. The intermediate drive mechanism 70 may transmit the power of the motor 20 to the second joint 200. Thus, the intermediate drive mechanism 70 may operate without a power source such as a motor.

The intermediate drive mechanism 70 may include an intermediate spur gear 72. The rotational axis of the intermediate spur gear 72 may be oriented parallel to and offset with respect to the center axis 6. The intermediate spur gear 72 may be configured to engage with the first crown gear 102B of the first joint 100. Alternatively, the intermediate spur gear 72 may be configured to engage with the first crown gear 102A of the first joint 100.

The intermediate spur gear 72 may be operably coupled to the second spur gear 204 of the second joint 200 and configured such that the second spur gear 204 of the second joint 200 rotates when the first crown gears 102A, 102B of the first joint 100 rotates. The intermediate spur gear 72 may be directly coupled to the second spur gear 204 of the second joint 200. For example, the intermediate spur gear 72 may be the second spur gear 204 of the second joint 200. Alternatively, the intermediate spur gear 72 may be coupled to the second spur gear 204 of the second joint 200 via any gear mechanism. For example, the intermediate spur gear 72 may be coupled to the second spur gear 204 of the second joint 200 via a first intermediate drive shaft 73, a second intermediate drive shaft 74 and a shift gearbox 76, as shown in FIG. 1. One end of the first intermediate drive shaft 73 may be coupled to the intermediate spur gear 72. The first intermediate drive shaft 73 may define the rotational axis of the intermediate spur gear 72. One end of the second intermediate drive shaft 74 may be coupled to the second spur gear 204 of the second joint 200. The second intermediate drive shaft 74 may define the rotational axis of the second spur gear 204. Another end of the first intermediate drive shaft 73 may be coupled to another end of the second intermediate drive shaft 74 via the shift gearbox 76. If it is desired that the rotational axis of the second spur gear 204 correspond to the center axis 6, the offset between the first intermediate drive shaft 73 and the center axis 6 may be compensated for by the shift gearbox 76. The shift gearbox 76 may have any gear mechanism such as a reduction gear. The shift gearbox 76 may have two spur gears (not shown) which are engaged with each other, and one of the spur gears may be coupled to the other end of the first intermediate drive shaft 73, and another of the spur gears may be coupled to the other end of the second intermediate drive shaft 74.

The actuator 1 may include more than two sets of twin clutch mechanisms. The respective sets of the clutch mechanisms may be provided for the corresponding joints. In FIG. 1, first clutch mechanisms 150A, 150B (i.e., a first set) provided for the first joint 100 and second clutch mechanisms 250A, 250B (i.e., a second set) provided for the second joint 200 are shown.

The first clutch mechanisms 150A, 150B may be provided between the first arm 40 and the second arm 50. The first clutch mechanisms 150A, 150B may be mounted on the second arm 50. The first clutch mechanism 150A may be configured to selectively engage or disengage between the rotation shaft 103A of the first crown gear 102A and the second arm 50. The first clutch mechanism 150B may be configured to selectively engage or disengage between the rotation shaft 103B of the first crown gear 102B and the second arm 50.

When the first clutch mechanism 150A engages between the rotation shaft 103A of the first crown gear 102A and the second arm 50, the second arm 50 can be driven by the motor 20 to rotate about the first rotational axis 42 in a first rotational direction R1 with respect to the first arm 40. The first rotational direction R1 may correspond to a rotational direction R1 of the first crown gear 102A. When the first clutch mechanism 150A disengages between the rotation shaft 103A of the first crown gear 102A and the second arm 50, the rotational torque in the first rotational direction R1 from the motor 20 may not be transmitted to the second arm 50 via the rotation shaft 103A of the first crown gear 102A.

Similarly, when the first clutch mechanism 150B engages between the rotation shaft 103B of the first crown gear 102B and the second arm 50, the second arm 50 can be driven by the motor 20 to rotate about the first rotational axis 42 in a second rotational direction R2 with respect to the first arm 40. The second rotational direction R2 may correspond to a rotational direction R2 of the first crown gear 102B and thus may be opposite to the first rotational direction R1. When the first clutch mechanism 150B disengages between the rotation shaft 103B of the first crown gear 102B and the second arm 50, the rotational torque in second rotational direction R2 from the motor 20 may not be transmitted to the second arm 50 via the rotation shaft 103B of the first crown gear 102B.

The second clutch mechanisms 250A, 250B may be provided between the second arm 50 and the third arm 60. The second clutch mechanisms 250A, 250B may be mounted on the third arm 60. The second clutch mechanism 250A may be configured to selectively engage or disengage between the rotation shaft 203A of the second crown gear 202A and the third arm 60. The second clutch mechanism 250B may be configured to selectively engage or disengage between the rotation shaft 203B of the second crown gear 202B and the third arm 60.

When the second clutch mechanism 250A engages between the rotation shaft 203A of the second crown gear 202A and the third arm 60, the third arm 60 can be driven by the motor 20 to rotate about the second rotational axis 52 in a first rotational direction R1 with respect to the second arm 50. The first rotational direction R1 may correspond to a rotational direction of the second crown gear 202A. When the second clutch mechanism 250A disengages between the rotation shaft 203A of the second crown gear 202A and the third arm 60, the rotational torque in the first rotational direction R1 from the motor 20 may not be transmitted to the third arm 60 via the rotation shaft 203A of the second crown gear 202A.

Similarly, when the second clutch mechanism 250B engages between the rotation shaft 203B of the second crown gear 202B and the third arm 60, the third arm 60 can be driven by the motor 20 to rotate about the second rotational axis 52 in a second rotational direction R2 with respect to the second arm 50. The second rotational direction R2 may correspond to a rotational direction R2 of the second crown gear 202B and thus may be opposite to the first rotational direction R1. When the second clutch mechanism 250B disengages between the rotation shaft 203B of the second crown gear 202B and the third arm 60, the rotational torque in second rotational direction R2 from the motor 20 may not be transmitted to the third arm 60 via the rotation shaft 203B of the second crown gear 202B.

The actuator 1 may include more than two sets of twin rotary encoders. The respective sets of the rotary encoders may be provided for the corresponding joints. In FIG. 1, first rotary encoders 160A, 160B (i.e., a first set) are provided for the first joint 100 and second rotary encoders 260A, 260B (i.e., a second set) are provided for the second joint 200 are shown.

A rotary encoder 160A may be provided for the rotation shaft 103A. Rotary encoder 160A may include an encoder disk (not shown), which is configured to rotate with the rotation shaft 103A, and a photo interrupter which is fixed with respect to the second arm 50. Similarly, rotary encoder 160B may be provided for the rotation shaft 103B. Rotary encoder 160B may include an encoder disk (not shown), which is configured to rotate with the rotation shaft 103B, and a photo interrupter which is fixed with respect to the second arm 50.

When the second arm 50 rotates with respect to the first arm 40, a phase differential between a phase detected by rotary encoder 160A (i.e., first rotary encoder 160A) and a phase detected by rotary encoder 160B (i.e., first rotary encoder 160B) may change according to the angle between the first arm 40 and the second arm 50. Thus, the angle between the first arm 40 and the second arm 50 may be detected based on the output signals of the first rotary encoders 160A and 160B.

Similarly, a rotary encoder 260A may be provided for the rotation shaft 203A. Rotary encoder 260A may include an encoder disk (not shown), which is configured to rotate with the rotation shaft 203A, and a photo interrupter which is fixed with respect to the third arm 60. Similarly, rotary encoder 260B may be provided for the rotation shaft 203B. Rotary encoder 260B may include an encoder disk (not shown), which is configured to rotate with the rotation shaft 203B, and a photo interrupter which is fixed with respect to the third arm 60.

When the second arm 50 rotates with respect to the third arm 60, a phase differential between a phase detected by rotary encoder 260A (i.e., second rotary encoder 260A) and a phase detected by rotary encoder 260B (i.e., second rotary encoder 260B) may change according to the angle between the second arm 50 and the third arm 60. Thus, the angle between the second arm 50 and the third arm 60 may be detected based on the output signals of the second rotary encoders 260A and 260B.

It is noted that a pair of the first rotary encoders 160A and 160B may be replaced with a rotary encoder which may configured to directly detect the angle between the first arm 40 and the second arm 50. Similarly, a pair of the second rotary encoders 260A and 260B may be replaced with a rotary encoder which may be configured to directly detect the angle between the second arm 50 and the third arm 60. Further, the rotary encoders 160A, 160B, 260A and 260B may be of any type. For example, the rotary encoders 160A, 160B, 260A and 260B may be optical rotary encoders or magnetic rotary encoders. Further, the rotary encoders 160A, 160B, 260A and 260B may be replaced with any other angle detection device, such as a resolver, a potentiometer, etc.

Figure 2:
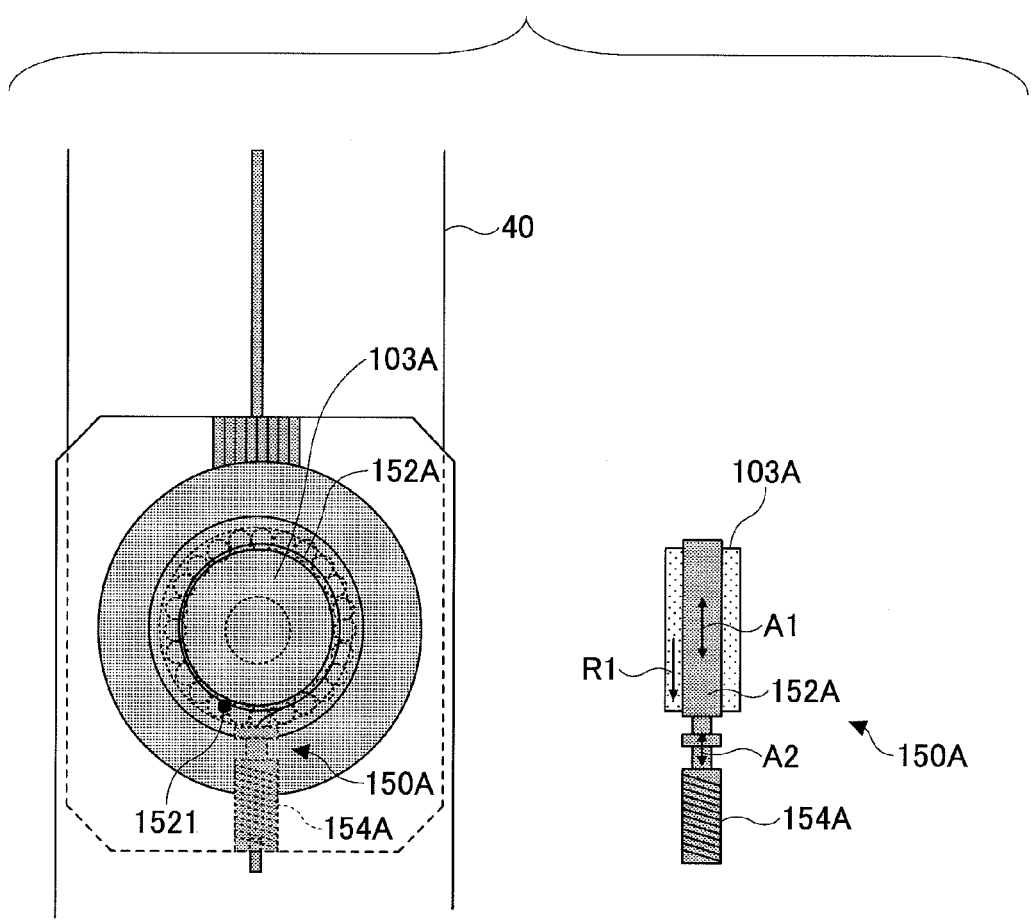
FIG. 2 is a magnified view of a first clutch mechanism.

FIG. 2 is a magnified view of an example clutch mechanism 150A that is arranged in accordance with at least some embodiments of the present disclosure. The example clutch mechanism 150A may be utilized as a first clutch mechanism 150A for the example actuator of FIG. 1. In FIG. 2, the first clutch mechanism 150A is shown in a two-view manner. It is noted that a configuration of the first clutch mechanism 150A illustrated and described with reference to FIG. 2 may be applied to other clutch mechanisms, such as first clutch mechanism 150B, second clutch mechanisms 250A, 250B, etc.

As shown in FIG. 2, the first clutch mechanism 150A may be a belt tension type. The first clutch mechanism 150A may include a clutch belt 152A and a solenoid 154A. Analogously, the first clutch mechanism 150B may include a clutch belt 152B and a solenoid 154B, the second clutch mechanism 250A may include a clutch belt 252A and a solenoid 254A, and the second clutch mechanism 250B may include a clutch belt 252B and a solenoid 254B. The clutch belt 152A may be wrapped about an outer surface of the rotation shaft 103A such that one end 1521 of the clutch belt 152A is substantially fixed to the outer surface of the rotation shaft 103A and the other end is coupled to the solenoid 154A. The clutch belt 152A may be selectively loosed or tensioned according to an ON/OFF state of the solenoid 154A (see arrows A1 and A2 in FIG. 2). When the clutch belt 152A is pulled and tensioned by the solenoid 154A, the rotation shaft 103A of the first crown gear 102A is configured to selectively engage with the second arm 50. When the clutch belt 152A is loosed, the rotation shaft 103A of the first crown gear 102A is configured to selectively disengage from the second arm 50.

It is noted that the first clutch mechanism 150A is not limited to the belt tension type and may be any type of a clutch mechanism.

Figure 3A:
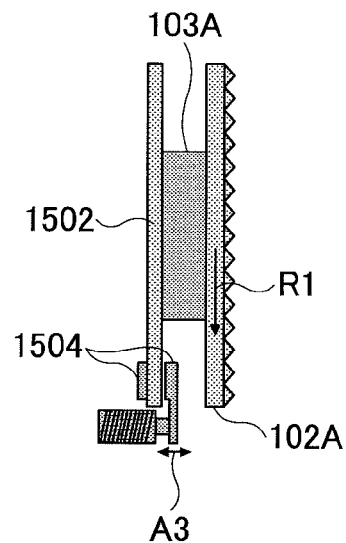
FIGS. 3A and 3B are diagrams illustrating alternative embodiments of clutch mechanisms.
Figure 3B:
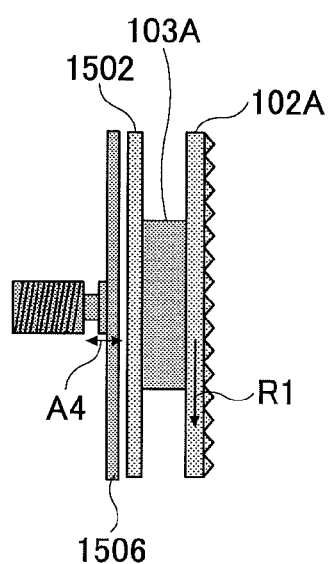

FIGS. 3A and 3B are diagrams illustrating alternative embodiments of clutch mechanisms arranged in accordance with various embodiments described herein. For example, the first clutch mechanism 150A may be a disk type, as shown in FIG. 3A. The selective engagement or disengagement between the rotation shaft 103A of the first crown gear 102A and the second arm 50 may be switched according to an ON/OFF state of the solenoid 154A (see arrow A3 in FIG. 3A), as is the case with the belt tension type. As shown in FIG. 3A, the rotation shaft 103A of the first crown gear 102A may be selectively engaged with the second arm 50 by pressing friction members 1504 against a disk 1502 therebetween (like a caliper of a disk brake) using the solenoid 104A.

Further, the first clutch mechanism 150A may be a circular disk type, as shown in FIG. 3B. The selective engagement or disengagement between the rotation shaft 103A of the first crown gear 102A and the second arm 50 may be switched according to an ON/OFF state of the solenoid 154A (see arrow A4 in FIG. 3B). As shown in FIG. 3B, the rotation shaft 103A of the first crown gear 102A may be selectively engaged with the second arm 50 by pressing a circular friction member 1506 against a disk 1502 using the solenoid 104A.

It is also noted that the solenoid 154A may be any type. For example, the solenoid 154A may be a magnetic or hydraulic type. Further, the solenoid 154A may be replaced with an electric motor or any type of a hydraulic motor.

Figure 4:
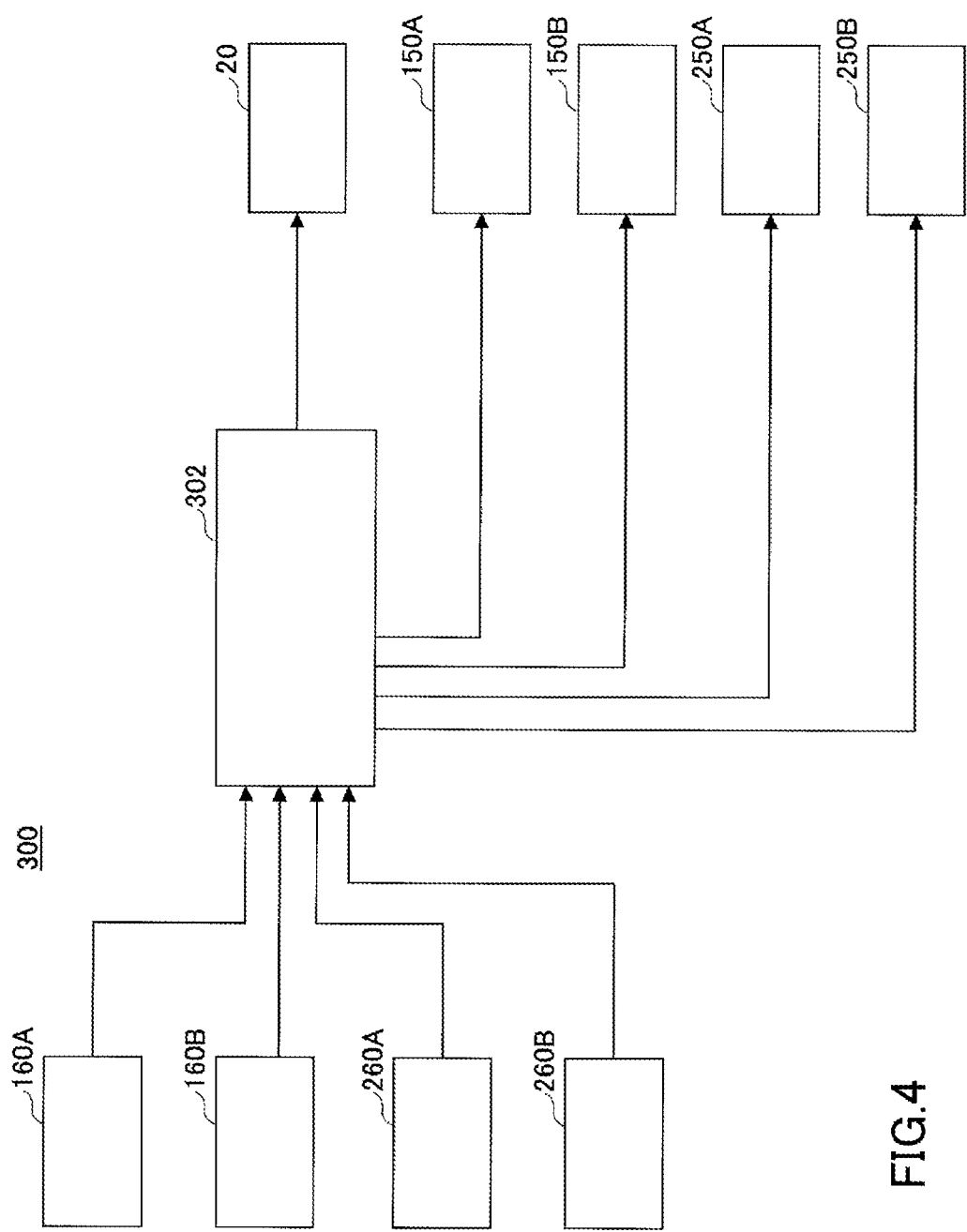
FIG. 4 is a diagram illustrating a control system 300 of an actuator.

FIG. 4 is a diagram illustrating an example control system 300 of an actuator, arranged in accordance with at least some embodiments of the present disclosure. In some examples, control system 300 may be adapted for use with actuator 1 as described herein.

The control system 300 may include a controller 302. The controller 302 may be configured with a microprocessor that includes a CPU, a ROM, a RAM, etc., (not shown) which are intercoupled via appropriate buses. In the ROM may be stored computer readable programs to be carried out by the CPU and data.

In some examples, the controller 302 may be incorporated in a body of the actuator 1. Alternatively or additionally, the controller 302 may be located remotely. In other words, the actuator 1 may be configured for operation by remote control.

The controller 302 may be coupled to the motor 20. The controller 302 may also be coupled to the respective clutch mechanisms 150A, 150B, 250A and 250B. The controller 302 may further be coupled to the respective rotary encoders 160A, 160B, 260A and 260B. The controller 302 may be configured to control the motor 20 and respective clutch mechanisms 150A, 150B, 250A and 250B based on output signals from the rotary encoders 160A, 160B, 260A and 260B.

For example, the controller 302 may configured to control the motor 20 and the respective clutch mechanisms 150A, 150B, 250A and 250B such that the first arm 40 rotates with respect to the second arm 50 by a first target angle with a first target rotational speed and the second arm 50 rotates with respect to the third arm 60 by a second target angle with a second target rotational speed. The motor 20 and/or the respective clutch mechanisms 150A, 150B, 250A and 250B may be controlled in any type of open-loop control or closed loop control. In the case of the closed loop control, the current and/or voltage to be applied to the motor 20 and/or duty ratios of driving signals (solenoid on/off signals) to be applied to the clutch mechanisms 150A, 150B, 250A and 250B may be determined based on the differential between the respective target values (i.e., the first target angle and the first target rotational speed, for example) and the corresponding current and/or voltage values which may be derived from output signals from the rotary encoders 160A, 160B, 260A and 260B. Such a feedback control may be implemented in any manner including PD (Proportional-Derivative) control and PID (Proportional-Integral-Derivative) control. The respective target values may be set based on instructions input by a user. Alternatively or additionally, the respective target values may be set automatically based on an algorithm. The algorithm may be constructed such that the actuator 1 operates based on operational circumstances, such as load applied to the actuator 1. The algorithm may be varied with an application for which the actuator 1 is to be used. Further, it is noted that the first target angle and the second target angle may be defined by an absolute angle (e.g., a predetermined angle that is substantially constant) with respect to the center axis 6.

The respective clutch mechanisms 150A, 150B, 250A and 250B may be controlled by Pulse Width Modulation (PWM) driving. For example, the angle between the first arm 40 and the second arm 50 may be varied by adjusting a duty cycle ratio of a PWM drive signal(s) that are applied to the solenoids 154A, 154B of the clutch mechanisms 150A, 150B. Further, the rotational speed of the second arm 50 with respect to the first arm 40 (i.e., a change rate in the angle between the first arm 40 and the second arm 50) may be varied by adjusting a duty cycle ratio of the PWM drive signal(s) that are applied to the solenoids 154A, 154B of the clutch mechanisms 150A, 150B. Alternatively or additionally, the rotational speed of the second arm 50 with respect to the first arm 40 may be varied by adjusting the rotational speed of the motor 20. The same is true for the angle between the second arm 50 and the third arm 60. The rotational speed of the motor 20 may be determined based on the higher of a load on the first joint 100 and a load on the second joint 200. For example, the rotational speed of the motor 20 may be determined based on the higher of the first target rotational speed and the second target rotational speed.

Figure 5A:
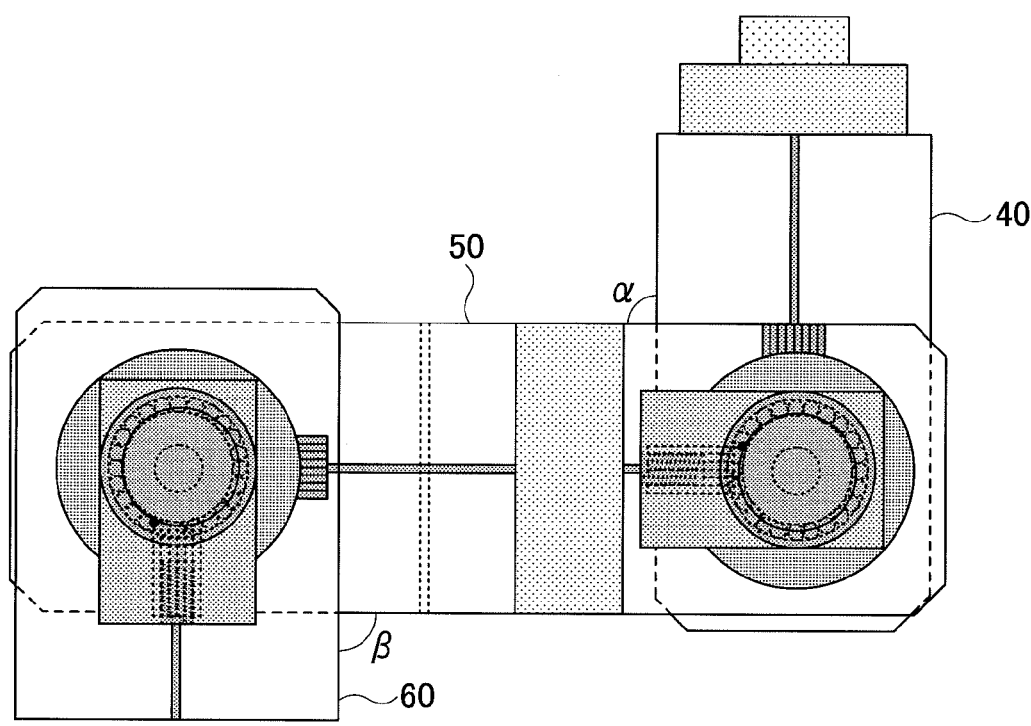
FIGS. 5A and 5B are diagrams illustrating states in which the angles of various arms of an actuator are changed, all arranged in accordance with at least some embodiments described herein.
Figure 5B:
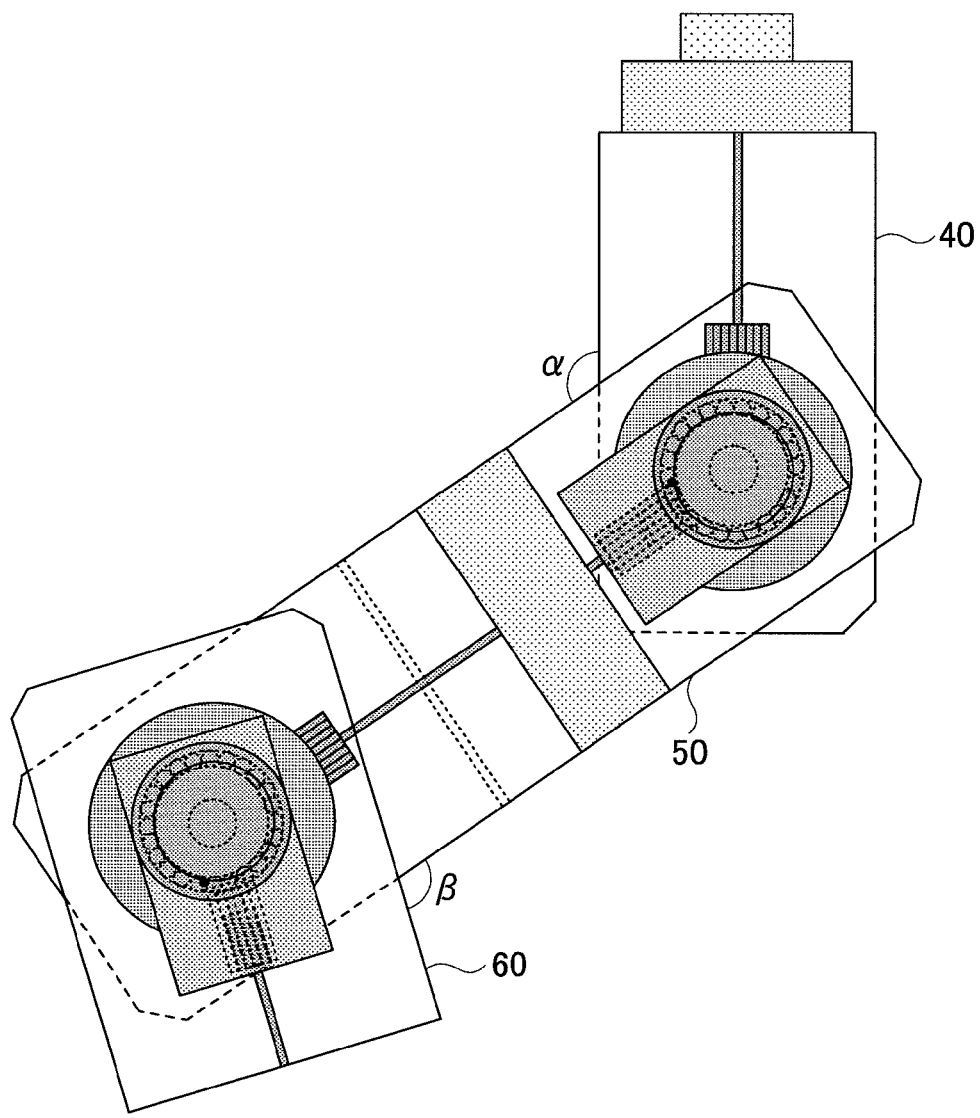

FIGS. 5A and 5B are diagrams illustrating states in which the angles of various arms of an actuator are changed in accordance with at least some embodiments of the present disclosure.

In some example, arms 40, 50 and 60 can be changed for actuator 1. In FIG. 5A, the angle $\alpha$ between the first arm 40 and the second arm 50 is about 90 degrees and the angle $\beta$ between the second arm 50 and the third arm 60 is about 90 degrees. In FIG. 5B, the angle $\alpha$ between the first arm 40 and the second arm 50 is about 125 degrees and the angle $\beta$ between the second arm 50 and the third arm 60 is about 115 degrees.

The weight of the actuator 1 may be reduced using a single motor 20, and as a result, the actuator 1 may be operated at high speed. However, it is noted that several actuators 1 may be used in a single robot, for example. Further, in general, the number of the motors 20 may be less than the number of the joints.

It should be understood that variations and modifications may be made without departing from the disclosure.

For example, in an above described example, the location of the motor 20 is arbitrary. The motor 20 may be directly or indirectly coupled to any one of the gears of the first joint 100. For example, the motor 20 may be coupled to any one of the first crown gears 102A and 102B. Specifically, the motor 20 may be provided to directly rotate one of the rotation shafts 103A and 103B. In this case, the motor 20 may be coupled to the one of the rotation shafts 103A and 103B directly or indirectly via another mechanism which may include a gear (a reduction gear, for example), a shaft, a series of gears, etc. Further, the motor 20 may be provided to directly rotate the intermediate spur gear 72. In this case, the motor 20 may be coupled to the intermediate spur gear 72 directly or indirectly via another mechanism which may include a gear (a reduction gear, for example), a shaft, a series of gears, etc. Further, the motor 20 may be provided to directly rotate one of the gears of the second joint 200. Similarly, in this case, the motor 20 may be directly or indirectly coupled to any one of the gears of the second joint 200. For example, the motor 20 may be provided to directly rotate one of the rotation shafts 203A and 203B. In this case, the motor 20 may be coupled to the one of the rotation shafts 203A and 203B directly or indirectly via another mechanism which may include a gear (a reduction gear, for example), a shaft, a series of gears, etc. Further, the motor 20 may be provided to directly rotate the intermediate spur gear 72 which is engaged with the second crown gear 202B. In this case, the motor 20 may be coupled to the intermediate spur gear 72 directly or indirectly via another mechanism which may include a gear (a reduction gear, for example), a shaft, a series of gears, etc.

The herein described subject matter sometimes illustrates different components contained within, or connected with, different other components. It is to be understood that such depicted architectures are merely examples and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While certain example techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

The invention claimed is:

1. An actuator comprising:
a motor;
a first element;
a second element;
a third element;
a first joint provided between the first element and the second element and adapted such that the second element is rotatable with respect to the first element about a first rotational axis, wherein the first joint includes:
   two first crown gears configured to oppose each other and to rotate about the first rotational axis, wherein one of the two first crown gears is operably coupled to the motor;
   a first spur gear configured to engage with the two first crown gears and to rotate about the first rotational axis such that the two first crown gears rotate in opposite directions when the first spur gear rotates; and
   two first thrust bearings provided between the first element and the corresponding first crown gears;
a second joint provided between the second element and the third element and adapted such that the third element is rotatable with respect to the second element about a second rotational axis, wherein the second joint includes:
   two second crown gears configured to oppose each other and to rotate about the second rotational axis;
   a second spur gear configured to engage with the two second crown gears such that the two second crown gears rotate in opposite directions when the second spur gear rotates; and
   two second thrust bearings provided between the second element and the corresponding second crown gears;
two first clutch mechanisms provided between the first element and the second element, wherein one of the first clutch mechanisms is configured to selectively engage or disengage between a rotational shaft of one of the first crown gears and the second element, and wherein another of the first clutch mechanisms is configured to selectively engage or disengage between a rotational shaft of another of the first crown gears and the second element;
two second clutch mechanisms provided between the second element and the third element, wherein one of the second clutch mechanisms is configured to selectively engage or disengage between a rotational shaft of one of the second crown gears and the third element, and wherein another of the second clutch mechanisms is configured to selectively engage or disengage between a rotational shaft of another of the second crown gears and the third element;
an intermediate drive mechanism provided between the first joint and the second joint, wherein the intermediate drive mechanism includes an intermediate spur gear configured to engage with one of the first crown gears of the first joint and operably coupled to the second spur gear of the second joint such that the second spur gear of the second joint rotates when one of the first crown gears of the first joint rotates;
two first rotary encoders coupled to corresponding ones of the two first crown gears of the first joint and configured to generate first output signals;
two second rotary encoders coupled to corresponding ones of the second crown gears of the second joint and configured to generate second output signals; and
a controller configured to control the motor, the first clutch mechanism, and the second clutch mechanism based on the first and second output signals from the first and second rotary encoders such that the first element rotates with respect to the second element by a first target angle with a first target rotational speed and the second element rotates with respect to the third element by a second target angle with a second target rotational speed.

2. An actuator comprising:
a first element;
a second element;
a third element;
a first joint provided between the first element and the second element, wherein the first joint comprises:
   two first crown gears configured to oppose each other and to rotate about a first rotational axis, wherein the first crown gears are operably coupled to the second element; and
   a first spur gear configured to engage with the two first crown gears such that the two first crown gears rotate in opposite directions when the first spur gear rotates;
a second joint provided between the second element and the third element; and
a motor operably coupled to the first joint and configured such that the second element selectively rotates in either a first rotation direction or a second rotation direction with respect to the first element about the first rotational axis when the motor rotates, wherein the first joint is operably coupled to the second joint and configured such that the third element selectively rotates in either the first rotation direction or the second rotation direction with respect to the second element about a second rotational axis when the motor rotates, wherein the second joint is configured so that the third element rotates in either the first rotation direction or the second rotation direction regardless of whether the second element rotates in the first rotation direction or the second rotation direction.

3. The actuator as claimed in claim 2, wherein:
the second joint comprises:
two second crown gears configured to oppose each other and to rotate about the second rotational axis, wherein the second crown gears are operably coupled to the third element; and
a second spur gear configured to engage with the two second crown gears such that the two second crown gears rotate in opposite directions when the second spur gear rotates.

4. The actuator as claimed in claim 3, further comprising:
an intermediate drive mechanism provided between the first joint and the second joint, wherein the intermediate drive mechanism includes an intermediate spur gear configured to engage with one of the first crown gears of the first joint and operably coupled to the second spur gear of the second joint such that the second spur gear of the second joint rotates when one of the first crown gears of the first joint rotates.

5. The actuator as claimed in claim 4, wherein the intermediate drive mechanism further comprises:
a first intermediate drive shaft coupled to the intermediate spur gear of the intermediate drive mechanism;
a second intermediate drive shaft coupled to the second spur gear of the second joint; and
a shift gearbox with which the first intermediate drive shaft is engaged with the second spur gear.

6. The actuator as claimed in claim 3, further comprising:
two first clutch mechanisms provided between the first element and the second element, wherein one of the first clutch mechanisms is configured to selectively engage or disengage between a rotational shaft of one of the first crown gears and the second element, and wherein another of the first clutch mechanisms is configured to selectively engage or disengage between a rotational shaft of another of the first crown gears and the second element; and
two second clutch mechanisms provided between the second element and the third element, wherein one of the second clutch mechanisms is configured to selectively engage or disengage between a rotational shaft of one of the second crown gears and the third element, and wherein another of the second clutch mechanisms is configured to selectively engage or disengage between a rotational shaft of another of the second crown gears and the third element.

7. The actuator as claimed in claim 6, further comprising:
two first rotary encoders coupled to corresponding ones of the first crown gears of the first joint and configured to generate first output signals;
two second rotary encoders coupled to corresponding ones of the second crown gears of the second joint and configured to generate second output signals; and
a controller configured to control the motor, the first clutch mechanism, and the second clutch mechanism based on the first and second output signals from the first and second rotary encoders such that the first element rotates with respect to the second element by a first target angle with a first target rotational speed and the second element rotates with respect to the third element by a second target angle with a second target rotational speed.

8. The actuator as claimed in claim 3, further comprising a first drive shaft configured to couple the first spur gear to the motor.

9. The actuator as claimed in claim 3, wherein the motor is coupled to one of the first crown gears and also coupled to the first spur gear of the first joint.

10. The actuator as claimed in claim 4, wherein the motor is coupled to the intermediate spur gear.

11. The actuator as claimed in claim 3, wherein the first joint further comprises two first thrust bearings provided between the first element and the corresponding first crown gears, and the second joint further comprises two second thrust bearings provided between the second element and the corresponding second crown gears.

12. An actuator comprising:
a first element;
a second element;
a third element;
a first joint provided between the first element and the second element;
a second joint provided between the second element and the third element;
a motor operably coupled to the first joint and configured such that the second element selectively rotates in either a first rotation direction or a second rotation direction with respect to the first element about a first rotational axis when the motor rotates, wherein the first joint is operably coupled to the second joint and configured such that the third element selectively rotates in either the first rotation direction or the second rotation direction with respect to the second element about a second rotational axis when the motor rotates, wherein the second joint is configured so that the third element rotates in either the first rotation direction or the second rotation direction regardless of whether the second element rotates in the first rotation direction or the second rotation direction;
two first clutch mechanisms provided between the first element and the second element, wherein one of the first clutch mechanisms is configured to selectively engage or disengage between a rotational shaft of one of a first gear and the second element, and wherein another of the first clutch mechanisms is configured to selectively engage or disengage between a rotational shaft of a second gear and the second element;
two second clutch mechanisms provided between the second element and the third element, wherein one of the second clutch mechanisms is configured to selectively engage or disengage between a rotational shaft of a third gear and the third element, and wherein another of the second clutch mechanisms is configured to selectively engage or disengage between a rotational shaft of a fourth gear and the third element;
two first rotary encoders coupled to corresponding ones of the first and second gears of the first joint and configured to generate first output signals;
two second rotary encoders coupled to corresponding ones of the third and fourth gears of the second joint and configured to generate second output signals; and
a controller configured to control the motor, the first clutch mechanism, and the second clutch mechanism based on the first and second output signals from the first and second rotary encoders such that the first element rotates with respect to the second element by a first target angle with a first target rotational speed and the second element rotates with respect to the third element by a second target angle with a second target rotational speed.

13. The actuator as claimed in claim 12, wherein at least one clutch mechanism of the two first clutch mechanisms or the two second clutch mechanisms includes a clutch belt having one end wrapped about and fixed to an outer surface of a corresponding rotational shaft and another end which is coupled to a solenoid, the clutch belt being selectively loosed to disengage the at least one clutch mechanism from a corresponding element or tensioned so as to engage the at least one clutch mechanism with the corresponding element according to an ON/OFF state of the solenoid.

14. The actuator as claimed in claim 12, wherein at least one clutch mechanism of the two first clutch mechanisms or the two second clutch mechanisms includes a friction member and a disk fixed to a corresponding rotational shaft, the friction member being caused to selectively engage and disengage with the disk according to an ON/OFF state of a solenoid.

\* \* \* \* \*